W. T. Porter,
Clutch.
Nº 79,080. Patented June 23, 1868.
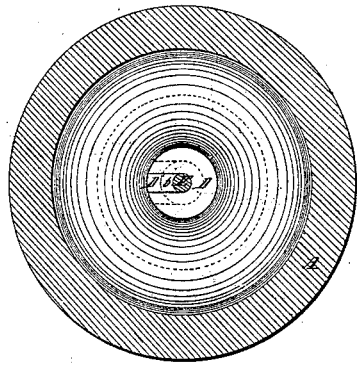
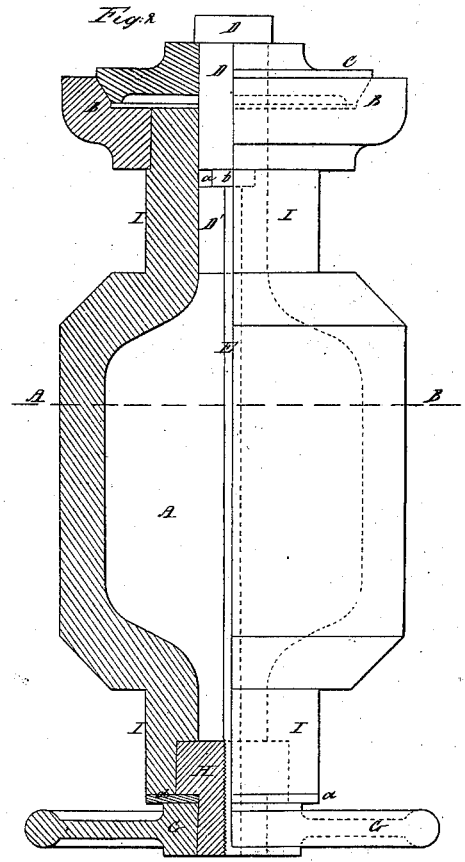
Witnesses.
Inventor

United States Patent Office.

WILLIAM T. PORTER, OF WILMINGTON, DELAWARE.

Letters Patent No. 79,080, dated June 23, 1868.

IMPROVEMENT IN DEVICE FOR STOPPING AND STARTING CALENDER-ROLLS.

The Schedule referred to in these Letters Patent and making part of the same.

TO ALL WHOM IT MAY CONCERN:

Be it known that I, WILLIAM T. PORTER, of Wilmington, in the county of New Castle, and State of Delaware, have invented a new and improved Device for Stopping and Starting Calender-Rolls; and I do hereby declare that the following is a full, clear, and exact description thereof, which will enable those skilled in the art to make and use the same, reference being had to the accompanying drawings, forming part of this specification, in which—

Figure 1 is a cross-section of the rolls through the line A B, fig. 2.

Figure 2 is a sectional plan of the same, one-quarter of the roll being removed by longitudinal planes intersecting at its axis-line.

Similar letters of reference indicate corresponding parts.

The object of this invention is to operate the friction-clutch of calender-rolls in paper-machines, by means of a rod, bar, or bolt, running through the axial centre of the said roll.

In the accompanying plate of drawings, the roll is shown at A, the same being cast hollow, by means of a core, in the usual manner.

A bolt or rod, E, passes through the axis of the roll. One end of this rod is formed with a screw-thread, which works in a corresponding hollow screw, in the hub-block H, on which latter is keyed a hand-wheel, G.

The hub-block fits with finished contact within a cylindrical recess in the reduced end of the roll, as shown, so that the said block and hand-wheel will revolve with the roll.

The friction-clutch C fits in contact with the friction-flange B, in the usual manner, nothing new being claimed in the construction of this part.

The clutch-disk C is keyed on a shaft, D, which latter is the driving-shaft, or the shaft which communicates motion to the roll, for the reduced ends I rest in journals in the frame of the machine, and the roll is driven by the shaft D of the clutch.

This is the common manner of driving the lower roll in paper-machines, and nothing new is claimed in its construction, per se, but in order to obviate the necessity of going to the rear of the machine to throw the cluch in or out of gear with the roll, as was necessary with the clutch-devices heretofore employed, I connect the bolt E, before described, with the shaft D, by a swivel-joint, and draw the clutch C in contact with the flange B, of the roll, by turning the hand-wheel G, for the said hand-wheel being keyed on the hub-block H, and the screw-thread of the bolt E working in the said hub-block, the clutch-disk C will be brought in contact with the flange B; and the roll be made to turn.

The swivel-joint, by which the bolt and shaft are connected, consists of the head $b$, fitting in a chamber or recess, $a$, in the shaft D.

The head $b$ forms part of the bolt E, and is entered in the said recess from the side of the shaft, the longitudinal slot D', in the shaft, permitting the lateral entrance of the bolt, as shown.

The slot D' and recess $a$ communicate with each other, and both open laterally on the shaft.

Other devices may be substituted for the screw-thread and hub-block, as shown, as a key, a cam, or a helical surface.

The swivel-joint is for the purpose of permitting the rotating of the shaft when the roll is stopped.

When the roll is to be stopped, the hand-wheel is seized and held, and the continued motion of the roll will throw off the clutch from the flange B, when the roll will cease to revolve.

An end plate, $d$, holds the hub-block within its recess, as shown.

The rod or bar, as shown, may be substituted by a tube or cylinder, with like result.

The parts of this machine are of metal. The axial connection of the clutch-disk with a hand-wheel, or its equivalent at the opposite end of the roll, renders the device simple and effective in throwing a calender-roll in and out of gear.

Having thus described my invention, what I claim as new, and desire to secure by Letters Patent, is—

The rod E, passing through the roll A, and connected at one end to the shaft D of the roller and friction-disk, by a swivel-joint, its other extremity fitting within the hub-block H, provided with the hand-wheel G, all constructed and arranged to operate substantially as and for the purpose herein set forth.

WM. T. PORTER.

Witnesses:
ALFRED D. POOL,
J. MORTON POOL.